United States Patent
Golding

(10) Patent No.: US 6,292,876 B1
(45) Date of Patent: Sep. 18, 2001

(54) METHOD FOR PROVIDING ACCESS PROTECTION FOR SCSI STORAGE DEVICES

(75) Inventor: Richard A. Golding, San Francisco, CA (US)

(73) Assignee: Hewlett-Packard Co, Palo Alto, CA (US)

( * ) Notice: Subject to any disclaimer, the term of this patent is extended or adjusted under 35 U.S.C. 154(b) by 0 days.

(21) Appl. No.: 09/249,494

(22) Filed: Feb. 12, 1999

(51) Int. Cl.$^7$ .................................................. G06F 12/00
(52) U.S. Cl. ............................ 711/163; 711/112; 711/114
(58) Field of Search .................................. 711/163, 100, 711/112, 114, 203

(56) References Cited

U.S. PATENT DOCUMENTS

| | | |
|---|---|---|
| 5,122,873 | 6/1992 | Golin . |
| 5,416,847 | 5/1995 | Boze . |
| 5,469,564 * | 11/1995 | Junya ................................ 395/188.01 |
| 5,613,068 * | 3/1997 | Gregg et al. ...................... 395/200.13 |
| 5,617,333 | 4/1997 | Oyamada et al. . |
| 6,073,218 * | 6/2000 | DeKoning ............................ 711/150 |
| 6,081,895 * | 6/2000 | Harrison ............................... 713/189 |

\* cited by examiner

Primary Examiner—Do Hyun Yoo
Assistant Examiner—Kimberly McLean

(57) ABSTRACT

An improved method for operating a storage system based on a SCSI communication protocol. In general, the storage system has a data storage medium for storing information and a controller for receiving and generating messages on a communication bus executing a SCSI communication protocol. The controller responds to first and second classes of messages, each message including data specifying the source device that sent the message and a destination device to receive information generated by the message. The first class of messages includes read/write requests directed to a mode page in the storage system, and the second class of messages includes read/write requests specifying an address in the storage system at which data is to be read or written. In a storage system according to the present invention, a virtual mode page is provided for each possible device on the communication bus. The virtual page includes a region of the storage medium reserved for that device. The region includes a first address range for communicating data from the controller to that device. The controller responds to one of said write message of the first class by placing information in the first address range of the virtual mode page corresponding to the source device identified in that message. In addition, the controller stores information enabling at least one of the devices to read information not available on a device that has not sent a message of the first class to the controller. The enabling information is stored in response to data in one of the write messages of the first class.

2 Claims, 2 Drawing Sheets

METHOD FOR PROVIDING ACCESS PROTECTION FOR SCSI STORAGE DEVICES

FIELD OF THE INVENTION

The present invention relates to networked computer systems, and more particularly, to a method for providing access protection for SCSI storage devices.

BACKGROUND OF THE INVENTION

Storage systems based on disks, tapes, or disk arrays attached to a shared communication channel such as a SCSI (small computer system interface) bus, FibreChannel, or SSA are commonly used in computer systems. The SCSI protocol was originally implemented as a protocol for communication between a single host computer and a number of peripheral devices on a SCSI bus. Hence, there was no need for security protocols of the types used in networks on the on the SCSI bus.

Recently, devices that communicate by the SCSI protocol and service multiple host computers via a bus utilizing the SCSI protocol have become common. For example, RAID systems consisting of a number of disk drives connected to a RAID controller are used to provide error tolerant storage systems. The RAID controller is connected to a bus utilizing a SCSI communications protocol that can be accessed by multiple host computers in some systems. The RAID controller looks like a single disk drive that is connected to the other computers in the system by a SCSI bus. Each computer accessing the RAID controller utilizes the SCSI protocol and sees the RAID system as a single disk connected thereto. If the host systems do not coordinate their reading and writing activities, the data stored on the RAID system can become corrupted. In addition, security considerations often require that the level of access be varied according to the host utilizing the device.

This type of security problem is well-known in networked computer systems. Such systems include many protocols that provide various levels of access protection for data stored on a server. The server software implements the security protocols. For example, each file on the server can be provided with individualized security, which restricts reading to a first group of hosts and writing to a second group of hosts. Unfortunately, there is no method for implementing such procedures on a shared SCSI bus because of the limited communication protocols implemented in the SCSI protocol.

In principle, more complex protection schemes could be implemented within the framework of the storage devices themselves using an extension of the existing SCSI protocol. Unfortunately, these protocols cannot be extended to include other functions without complex negotiations inside the standards organization that define the SCSI protocols.

In principle, a non-standard protocol can be implemented to provide extended protection at the device level by utilizing a non-standard SCSI protocol and altering the relevant drivers in all of the hosts and devices that access the SCSI bus. Unfortunately, the owner of the SCSI bus may not have access to all of the possible hosts, and hence, the altered protocols will prevent the unaltered SCSI drivers from accessing data on the SCSI bus.

Broadly, it is the object of the present invention to provide an improved data protection protocol that can be implemented within the existing SCSI without requiring formal extension of the SCSI protocols by the relevant standards committees.

It is a further object of the present invention to provide an improved data protection protocol that can operate in the SCSI framework without requiring all hosts and devices to be modified.

These and other objects of the present invention will become apparent to those skilled in the art from the following detailed description of the invention and the accompanying drawings.

SUMMARY OF THE INVENTION

The present invention is an improved method for operating a storage system based on a SCSI communication protocol. In general, the storage system has a data storage medium for storing information and a controller for receiving and generating messages on a communication bus executing a SCSI communication protocol. The controller responds to first and second classes of messages, each message including data specifying a source device that sends the message and a destination device to receive information generated by the message. The first class of messages includes read/write requests directed to a mode page in the storage system, and the second class of messages includes read/write requests specifying an address in the storage system at which data is to be read or written. In a storage system according to the present invention, a virtual mode page is provided for each possible device on the communication bus. The virtual page includes a region of the storage medium reserved for that device. The region includes a first address range for communicating data from the controller to that device. The controller responds to one of said write message of the first class by placing information in the first address range of the virtual mode page corresponding to the source device identified in that message. In addition, the controller stores information enabling at least one of the devices to read information not available on a device that has not sent a message of the first class to the controller. The enabling information is stored in response to data in one of the write messages of the first class. In one embodiment of the invention, a default access mode is provided for responding to read or write messages of the second class from one of the devices on the communication bus that has not previously sent one of the write messages of the first class to the controller. The default access mode provides limited access to data stored in the storage system.

DETAILED DESCRIPTION OF THE INVENTION

Figure 1:
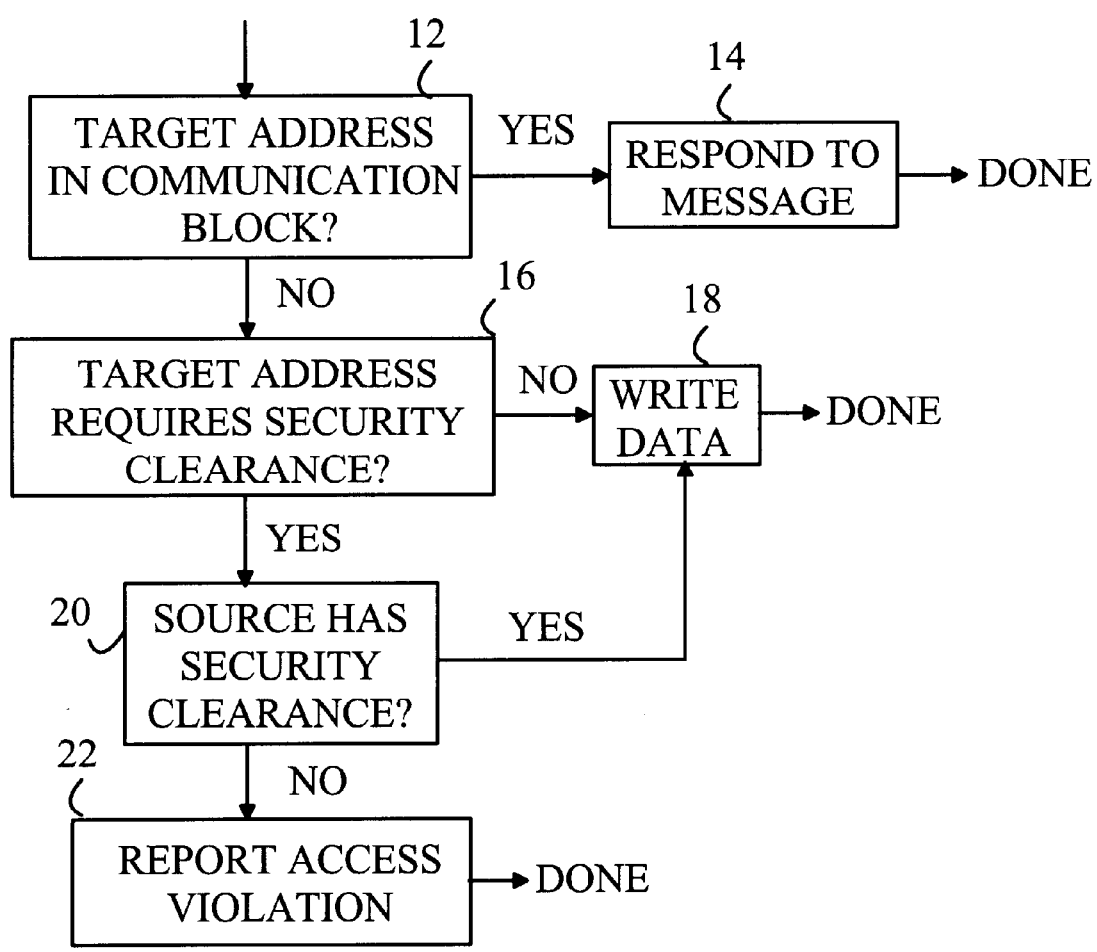
FIG. 1 is a flow chart of the procedure executed by a SCSI device according to the present invention upon receiving a write request directed to a mode page.

The present invention may be more easily understood with reference to the SCSI protocol currently in use. The SCSI protocol is used in many disks and disk arrays as the protocol by which host systems communicate with the storage device to request an operation. There are two groups of functions that can be requested. The first type of function is used to read or write the disk. These requests move data to or from specified data addresses in the device. The device presents a model of a linear array of sectors, and each read or write specifies which sectors are to be accessed.

The second type of function is used to transfer status information about the storage device. This information is organized into a set of mode pages, each of which has a page number and is organized as a linear array of bytes. A typical mode page might include the device's serial number (static information) in one set of bytes, a count of the number of errors that have occurred (dynamic information) in another set of bytes, and the policy setting for how the cache should be used (settable information) in another set of bytes.

All SCSI messages include source and destination addresses. These identify the host or device that sent the message, and the host or device that is to receive the information generated by the message.

The present invention makes use of the mode page feature of the SCSI protocol to provide a separate communication channel for use in implementing security features. In the present invention, each host or device on the SCSI bus is assigned its own virtual mode page. Hence, when host A and B read data from a specified mode page, the requests access different virtual pages. In this way the access from different hosts can be kept separate.

The virtual mode pages provide a host with a communication channel that is separate from its stream of read and write requests. The host or other device can use this separate channel to communicate about the properties of the ordinary read and write requests. For example, a host can establish data access rights through this communication channel. Because the virtual mode page separates communications from different hosts, each host can behave as if it has its own communication session with the storage device. That is, two hosts, A and B, can carry on separate, concurrent communications with the device without interfering with each other.

Communication sessions based on the virtual mode pages can be used to implement nearly any existing high-level network protocol. In particular, challenge-response mechanisms for establishing the identity of each party (without revealing secret information to an observer) can be implemented, as can protocols that establish a secret, shared encryption key.

The present invention can be used to implement data protection. Assume that host A wants to access protected data on disk D. Host A writes a special value to its virtual mode page on disk D, indicating that host A wants to establish its credentials as a source that has the rights to access that data. Disk D and host A execute a high-level protocol that establishes A's rights by exchanging messages via A's virtual page. When A needs to send a message in this protocol, it writes to an agreed-upon part of its virtual mode page. When D needs to send a message to A, it provides that message in A's mode page at a predetermined location, which A then reads. At the end of the protocol, if D believes that A has the right to access data on the disk, D stores A's source ID in an access table. When D receives read and write requests from A's source address, D can verify that requests from that source address are to be honored by checking its access table.

The above-described protocol requires that the host and the SCSI device be programmed to execute the security protocol via the virtual mode page. Hence, the present invention requires some alterations in the SCSI device. However, the present invention does not require that all hosts on the SCSI bus be modified. If a host does not establish rights via the virtual mode page protocol, the device can still grant the host limited data access rights. For example, the device can provide read-only access to certain files on the storage system to hosts that do not establish a higher security status via the mode access page.

The present invention can also be used to protect access to the configuration information on the device as well as to the stored data. For example, in a disk array, it may be desirable to limit the hosts that can change the configuration of the array. This is equivalent to requiring security clearance for writing portions of the virtual pages themselves. In this case, the portions in question are transferred to the disk area that governs in which such configuration information is actually stored.

Figure 2:
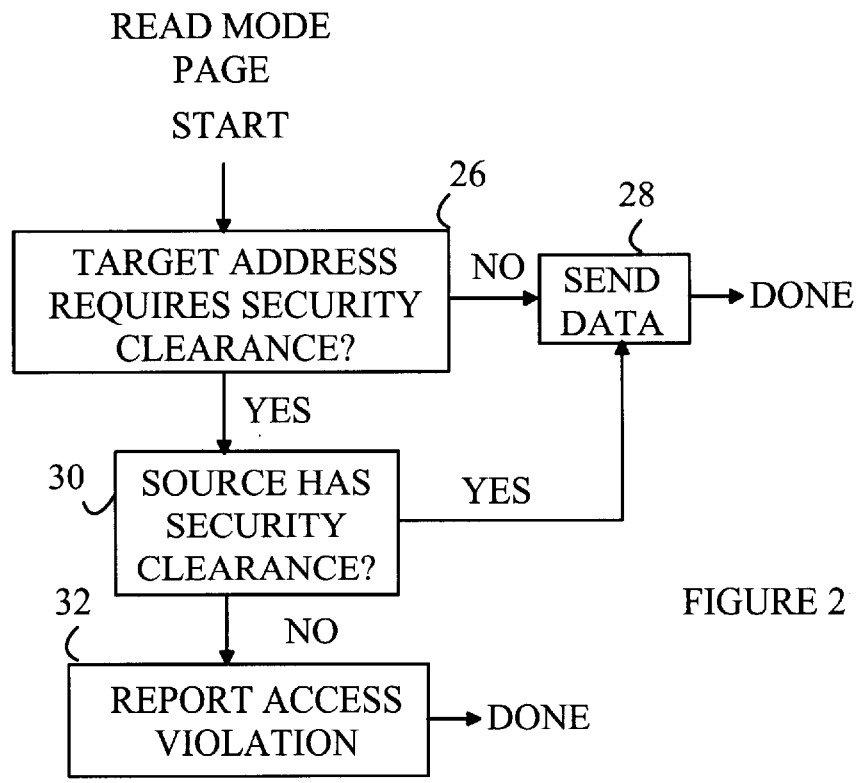
FIG. 2 is a flow chart of the procedure executed by a SCSI device according to the present invention upon receiving a read request for a mode page.

The manner in which the SCSI device processes read and write requests to the virtual pages and normal data storage areas will now be explained in more detail with reference to FIGS. 1–3. Refer now to FIG. 1, which is a flow chart of the procedure executed by the SCSI device upon receiving a write request directed to a mode page. The SCSI device checks the address to be written to determine if the address corresponds to a portion of the virtual page that is reserved for communication between the device and the host that sent the message as shown at 12. As noted above, each host has its own virtual page. If the address corresponds to a communication address, the host writes the data at that address in the virtual page and then responds to the message by writing data to another address in the virtual page at a location reserved for responses from the SCSI device. Since each host has its own virtual page, this data will not overwrite any data utilized by another host. The virtual pages may be stored at predetermined locations on the storage media that is managed by the SCSI device. Alternatively, the virtual pages may be constructed from data structures in the controller's memory, rather than being represented as an actual, contiguous part of the storage media. Once the SCSI device has responded to the message as shown at 14, the procedure is completed.

If the address in the message is not directed to a communication address in the virtual page, the SCSI device checks to see if the host that sent the message has the appropriate security clearance to write data to that virtual page address as shown at 16. As noted above, some of the virtual page addresses may control configuration data that affects all users of the device; hence, the security check is needed even though the virtual page is not shared by other hosts. If the host has the required security clearance, the data is written as shown at 18. In the preferred embodiment of the present invention, the SCSI device maintains a table with the virtual page security clearances allocated to each possible host. If the host does not have the required security clearance, the SCSI device reports a security violation and exits the procedure. The security violation message can be directed to a predetermined host on the network or the operating system of the host making the unauthorized request, or simply logged on the device, as appropriate to the particular data being accessed.

Data is read from the virtual mode pages by an analogous protocol. Refer now to FIG. 2, which is a flow chart of the procedure executed by the SCSI device upon receiving a read request for a mode page from a host on the SCSI bus. In principle, there may be data on the virtual page that requires a security clearance to access; hence, the preferred embodiment of the present invention checks the read request to determine if the target address requires a clearance as shown at 26. Requests to read the communication addresses on the virtual page do not require a clearance, since only the host associated with that virtual page can read the data, and the data is intended for that host to read. If no clearance is needed, the data is sent as shown at 28. If a security clearance is required, the security clearance of the host is checked as shown at 30, and an access violation message is generated if the host does not have the required security clearance as shown at 32.

Figure 3:
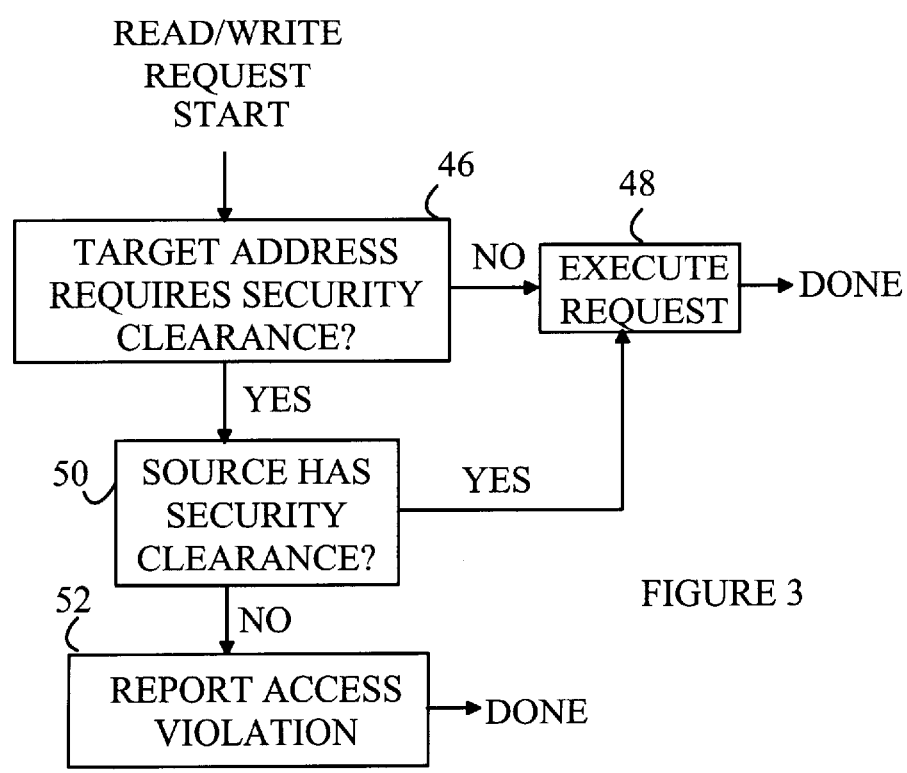
FIG. 3 is a flow chart of the procedure executed by a SCSI device according to the present invention for servicing normal read/write requests.

Refer now to FIG. 3, which is a flow chart of the procedure executed by the SCSI device for servicing normal read/write requests. First, the SCSI device checks the address in the message to determine if a security clearance is needed to service the request as shown at 46. If no clearance is needed, the request is executed as shown at 48. If no clearance is needed, a SCSI device according to the present invention behaves like a conventional SCSI device. If a security clearance is needed, the SCSI device references a table in the device to determine if the host requesting the data has the required clearance as shown at 50. If the host has previously established its clearance by a security dialog directed to the host through the virtual page of that host, the table will contain the appropriate security clearance. If the requesting host does not have the required clearance, the SCSI device provides whatever default access is available for the data at the requested address as shown at 52. For example, the default access may allow reading of the data but not writing.

The present invention may also be used to implement other types of security protocols. For example, data being written might be sent encrypted from the host, to prevent someone eavesdropping on the bus, but should be stored unencrypted on the storage medium. When the data is read back later, the data can be once again encrypted before being sent to the reader, each time using a different session key for encryption. In this embodiment, the session key would have been established during the security setup.

Various modifications to the present invention will become apparent to those skilled in the art from the foregoing description and accompanying drawings. Accordingly, the present invention is to be limited solely by the scope of the following claims.

What is claimed is:

1. In a method for operating a storage system having a data storage medium for storing information and a controller for storing and receiving information stored in said data storage medium, said controller receiving and generating messages on a communication bus executing a SCSI communication protocol, said controller responding to first and second classes of messages, each message including data specifying a source device that sent said message and a destination device to receive information generated by said message, said first class of messages comprising read/write requests directed to a mode page in said storage system and said second class of messages comprising read/write requests specifying an address in said storage system at which data is to be read or written, the improvement comprising the steps of:

providing a virtual mode page for each possible device on said communication bus, said virtual mode page comprising a first address range for communicating data from said controller to that device;

causing said controller to read data in a write message of said first class and responding to that write message by placing information in said first address range of said virtual mode page corresponding to said source device identified in that message; and causing said controller to store information enabling at least one of said devices to read information not available to a device that has not sent a message of said first class to said controller, said enabling information being stored in response to data in one of said write messages of said first class.

2. In a method for operating a storage system having a data storage medium for storing information and a controller for receiving and generating messages on a communication bus executing a SCSI communication protocol, said controller responding to first and second classes of messages, each message including data specifying a source device that sent said message and a destination device to receive information generated by said message, said first class of messages comprising read/write requests directed to a mode page in said storage system and said second class of messages comprising read/write requests specifying an address in said storage system at which data is to be read or written, the improvement comprising the steps of:

providing a virtual mode page for each possible device on said communication bus, said virtual mode page comprising a first address range for communicating data from said controller to that device;

causing said controller to read data in a write message of said first class and responding to that write message by placing information in said first address range of said virtual mode page corresponding to said source device identified in that message;

causing said controller to store information enabling at least one of said devices to read information not available to a device that has not sent a message of said first class to said controller, said enabling information being stored in response to data in one of said write messages of said first class; and providing a default access mode for responding to read or write messages of said second class from one of said devices on said communication bus that has not previously sent one of said write messages of said first class to said controller, said default access mode providing limited access to data stored in said storage system.

* * * * *